(12) United States Patent
McMahon

(10) Patent No.: US 6,716,382 B1
(45) Date of Patent: Apr. 6, 2004

(54) METHOD FOR PREPARING A TELESCOPING SHRINKABLE HOLLOW TUBE

(75) Inventor: Roy P. McMahon, Indianapolis, IN (US)

(73) Assignee: Raytheon Company, Waltham, MA (US)

( * ) Notice: Subject to any disclaimer, the term of this patent is extended or adjusted under 35 U.S.C. 154(b) by 398 days.

(21) Appl. No.: 09/922,447

(22) Filed: Aug. 3, 2001

(51) Int. Cl.[7] .......................... B29C 53/08; B29C 57/12; B29C 61/02

(52) U.S. Cl. .................. 264/230; 264/272.11; 264/295; 264/339; 264/342 R; 156/84; 156/85

(58) Field of Search ............................ 264/230, 272.11, 264/342 R, 295, 339; 156/84, 85; 29/881, 882

(56) References Cited

U.S. PATENT DOCUMENTS

| 2,027,962 | A | | 1/1936 | Currie .......................... 264/230 |
|---|---|---|---|---|
| 3,047,651 | A | * | 7/1962 | Hawkes ..................... 174/84 S |
| 3,086,242 | A | | 4/1963 | Cook et al. .................. 264/566 |
| 3,597,372 | A | | 8/1971 | Cook .......................... 523/300 |
| 3,824,331 | A | * | 7/1974 | Mixon, Jr. et al. .......... 174/135 |
| 4,140,412 | A | * | 2/1979 | Vitt .............................. 403/28 |
| 4,440,712 | A | * | 4/1984 | Imgram .................... 264/209.5 |
| 4,467,002 | A | * | 8/1984 | Crofts ........................ 428/34.9 |
| 5,098,752 | A | | 3/1992 | Chang et al. ............... 428/34.9 |
| 5,365,020 | A | * | 11/1994 | Vallauri et al. ............. 174/73.1 |
| 5,753,861 | A | * | 5/1998 | Hansen et al. ................ 174/93 |
| 5,868,584 | A | * | 2/1999 | Cook et al. ................... 439/98 |
| 6,015,600 | A | | 1/2000 | Greuel, Jr. et al. ........ 428/34.9 |
| 6,245,999 | B1 | * | 6/2001 | Costigan et al. .......... 174/74 A |
| 6,337,115 | B1 | * | 1/2002 | McMahon ................. 428/36.9 |

FOREIGN PATENT DOCUMENTS

JP    01-125215 A  *  5/1989  ........... B29C/61/06

* cited by examiner

Primary Examiner—Michael Colaianni
Assistant Examiner—Michael I. Poe
(74) Attorney, Agent, or Firm—William C. Schubert; Glenn H. Lenzen, Jr.; Colin M. Raufer

(57) ABSTRACT

A method for preparing a hollow tube of shrinkable polymeric material by providing a hollow tube in an expanded state and partially contracting a portion of the length of the hollow tube. A first length in the expanded state is folded over a second length in the partially contracted state. A body such as a length of electrical cable is inserted into the hollow tube, and the first length is unfolded so that it no longer overlies the second length. The first length and the second length are contracted to the fully contracted state over the body.

12 Claims, 2 Drawing Sheets

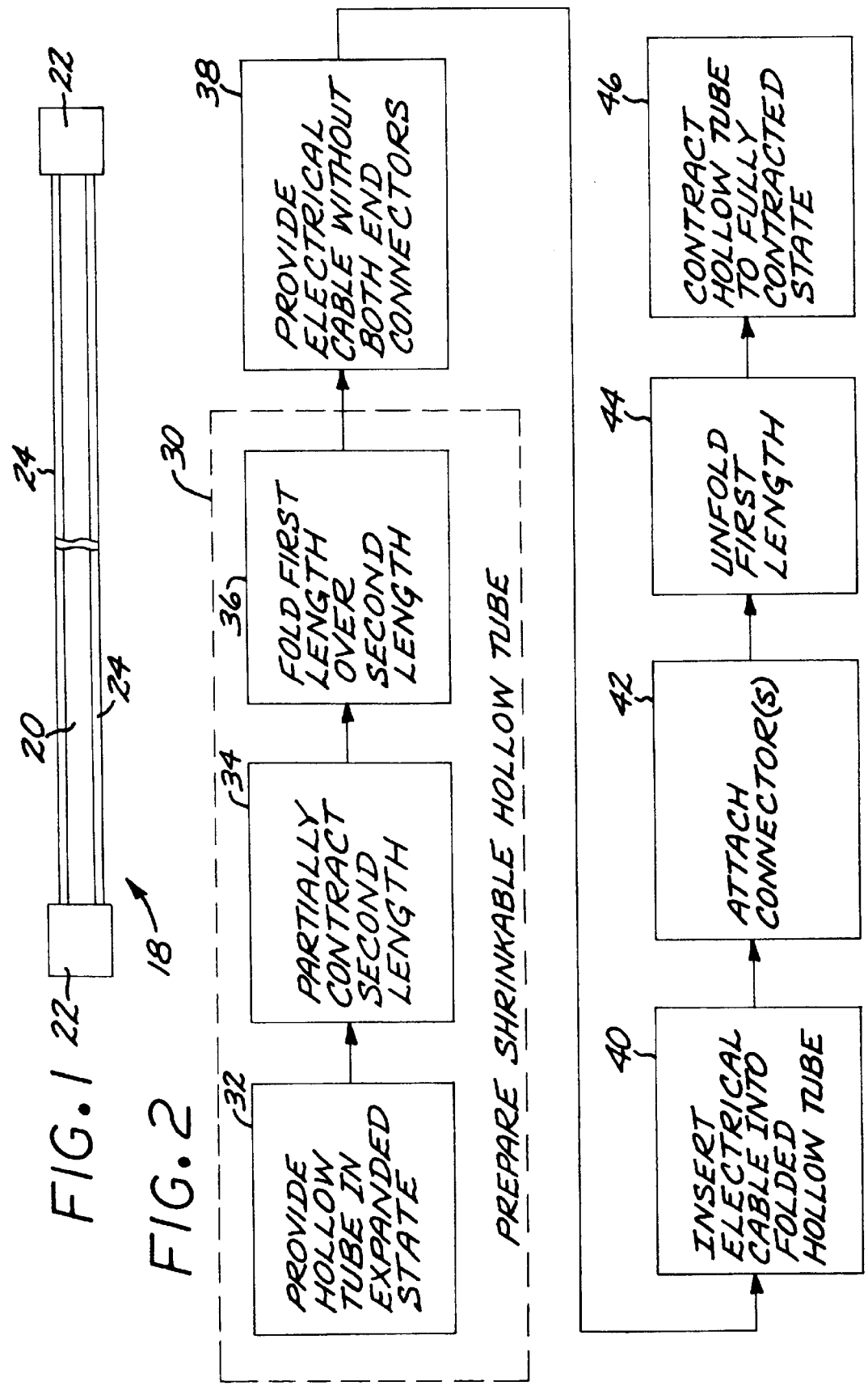

METHOD FOR PREPARING A TELESCOPING SHRINKABLE HOLLOW TUBE

This invention relates to the use of shrink tube and, more particularly, to a configuration of the shrink tube that is readily used to enclose bodies.

BACKGROUND OF THE INVENTION

Shape-recovering material, sometimes also called heat-shrinkable or heat-recoverable material, is widely used in marking and packaging applications. A working definition used herein is that the shape-recovering material is a polymer having materials properties described by a contracted state and an expanded state which contracts toward the contracted state upon heating.

When the shape-recovering material is provided in shrink-tube form, it is typically structured to contract to or toward a specified size in the contracted state. In its initial manufacturing, the shape-recovering material is typically extruded in a particular shape and size, expanded to the expanded state, and thereafter cooled so that the expanded state is retained. When it is to be used in service, the expanded and cooled material is placed overlying a body to be enclosed, and then again heated so that it contracts back toward the contracted state, thereby enclosing the body in a polymeric covering.

The shape-recovering material is sometimes used to enclose an electrical cable having a connector at each end thereof. In this application, the shape-recovering hollow tube of about the same length as the electrical cable is slipped over the electrical cable. The individual wires of the electrical cable are electrically connected to the terminals of the connectors. In order to have room to separate the individual wires and perform the electrical connections, the hollow tube is pushed back away from the connector to shorten its length in an accordion fashion. After the electrical connections are made, the hollow tube is allowed to relax back to its full length, and then it is heated to contract it to the contracted state.

While operable and widely used, this approach is inconvenient because it is difficult to shorten the hollow tube against the constraint of the enclosed electrical cable and because it is necessary to hold the hollow tube in the shortened configuration while the electrical connections are made. This holding in the shortened configuration may be accomplished manually or with a tool such as a clamp, but either approach interferes with the required electrical connection procedure. Also, for practical purposes the tubing is normally cut longer than the anticipated final assembled length, making the assembly even more difficult.

There is a need for an improved approach to the use of shape-recovering hollow tubes for enclosing bodies such as electrical cable. The present invention fulfills this need, and further provides related advantages.

SUMMARY OF THE INVENTION

The present invention provides a hollow shrink tube that is well suited for easy placement over a body such as an electrical cable. It is in a shortened telescoped form that is shorter than the body, so that the ends of the body are readily accessible. Cable connectors may be easily attached to the ends of the electrical cable, for example. The hollow shrink tube may then be telescoped back to its full length for subsequent contraction around the body. The shortened hollow shrink tube is readily prepared and avoids the need for awkward procedures to otherwise hold the shrink tube in the shortened form while attaching cable connectors. The shortened form of the tube is convenient for shipping and storage, such as in repair kits.

In accordance with the invention, a method for preparing an article includes preparing a shrinkable hollow tube. The hollow tube is made of a shape-recovering polymeric material having materials properties described by a fully contracted state, an expanded state which contracts toward the fully contracted state upon heating, and a partially contracted state resulting from a partial contracting from the expanded state toward the fully contracted state. The step of preparing is accomplished by providing a hollow tube in the expanded state, partially contracting a portion of the hollow tube, resulting in a first length of the hollow tube in the expanded state and a second length of the hollow tube in the partially contracted state, and folding the first length over the second length so that the first length radially overlies the second length. The folding step includes folding the first length once, twice, or more times over the second length to shorten the hollow tube. The total length of the hollow tube is thereby telescoped to a shorter length.

In use, a body such as an electrical cable is inserted into the hollow tube. The insertion is normally accomplished after the step of preparing, but it may be accomplished prior to the step of preparing. After the preparing and inserting are complete, the first length is unfolded so that it no longer overlies the second length, and the first length and the second length are contracted to the fully contracted state over the body.

The first length may be at a first end of the hollow tube, and the second length at a second end of the hollow tube. In another embodiment, there is a third length in the expanded state. The first length is at a first end of the hollow tube, and the third length is at a second end of the hollow tube, so that the second length is positioned between the first length and the third length. This configuration makes it easy to slip the third length of the folded hollow tube over the body.

Desirably, the materials properties of the hollow tube are such that a contraction ratio of an outer diameter of the hollow tube in the expanded state to an outer diameter of the hollow tube in the fully contracted state is from about 1.5:1 to about 2.5:1. The step of partially contracting preferably includes the step of contracting the hollow tube such that an outer diameter of the hollow tube in the partially contracted state is from about 5 to about 20 percent smaller than an outer diameter of the hollow tube in the expanded state.

The inner diameter of the partially contracted second length is reduced by at most only about 20 percent from the inner diameter of the expanded state. The folded configuration has a regular, circular inner diameter of the second length into which the body is easily inserted. The alternative embodiment with the fully expanded third length makes the insertion even easier. The body is inserted, but the shortened telescoped hollow tube is sufficiently shorter than the body such as the electrical cable so that the ends of the electrical cable are easily accessed for making connections. Once the work at the ends of the body is complete, the first length is folded back to its extended length to cover the entire length of the object. The entire hollow tube is then contracted to its fully contracted state.

Although the use of the shrinkable hollow tube is described in relation to its application to electrical cable, it may be used in other applications, such as to hold bundles of hydraulic tubing. It may also be used for decorative applications such as to apply a decorative ring to a cylindrical object.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 1 is a schematic depiction of a contracted hollow tube overlying an electrical cable having end connectors;

FIG. 2 is a block diagram of an approach for preparing the structure of FIG. 1;

DETAILED DESCRIPTION OF THE INVENTION

FIG. 1 illustrates an article 18 which in the preferred embodiment comprises a body in the form of an electrical cable 20 with end connectors 22. A number of electrical wires are within the electrical cable 20 but are not visible in FIG. 1. The electrical wires are connected to contacts within the connectors 22. A hollow tube 24 of a shape-recovering material overlies the electrical cable 20. The shape-recovering material is a polymer having a fully contracted state and an expanded state which contracts toward the contracted state upon heating.

The shape-recovering materials are discussed and specified more fully in MILSPEC MIL-DTL-23053, whose disclosure is incorporated by reference. Such polymeric materials provided in tubular form are well known in the art for other applications, but not for the present application, and are sometimes called "heat-shrinkable tubing" or "shrink tubing". Examples of operable shape-recovering materials include polyolefins, polyvinylidene fluoride, polychloroprene, polyvinyl chloride, polyethylene terephthalate, silicone rubber, polytetrafluoroethylene, fluorinated ethylene propylene, and ethylene-tetrafluoroethylene, but use of the invention is not limited to these materials. The shape-recovering-materials are also described in U.S. Pat. Nos. 6,015,600; 2,027,962; 3,086,242; and 3,597,372, whose disclosures are incorporated by reference. The present invention is operable with all such shape-recovering polymeric materials used for the hollow tube 24.

Figure 3:
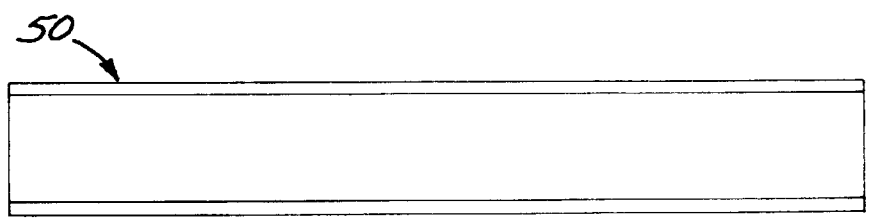
FIG. 3 is a schematic sectional view of a piece of hollow tube.

FIG. 2 is a block flow diagram of an approach for practicing the method of the present invention. A shrinkable hollow tube is prepared, numeral 30. In this preparation 30, a tube 50 of shape-recovering, heat-shrinkable material is provided in its expanded state, numeral 32, and as illustrated in FIG. 3. The tube 50 is made of a shape-recovering polymer such as those discussed above. The hollow tube 50 may be described as having a fully contracted state, the expanded state which contracts toward the fully contracted state upon heating, and a partially contracted state resulting from a partial contracting from the expanded state toward the fully contracted state. Such tube 50 is available commercially in a range of sizes, materials of construction, colors, and other physical characteristics, from vendors that supply tube according to MIL-DTL-23053. The tube 50 is typically relatively thick-walled, and sized to fit over the body to be enclosed when the tube is expanded and then contracted. For the present application, it is preferred that the tube 50 be made to have a contraction ratio of an outer diameter of the hollow tube in the expanded state to an outer diameter of the hollow tube in the fully contracted state of from about 1.5:1 to about 2.5:1.

Figure 4:
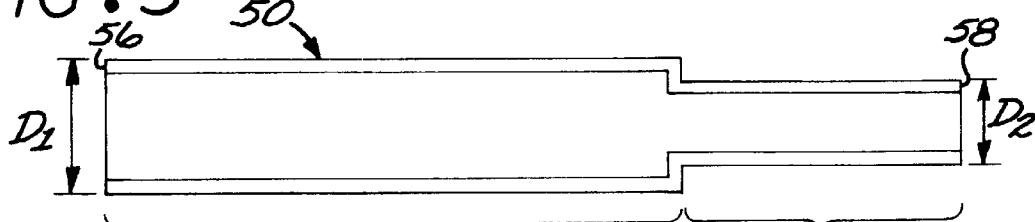
FIG. 4 is a schematic sectional view of the piece of hollow tube of FIG. 3, with a first length in the expanded state and a second length in the partially contracted state.

A portion of the length of the hollow tube 50 is partially contracted by heating it slightly, numeral 34 and FIG. 4. The result is a first length 52 of the hollow tube 50 in the expanded state and a second length 54 of the hollow tube 50 in the partially contracted state. (In the embodiment of FIG. 4, the first length 52 is at a first end 56 of the hollow tube 50, and the second length 54 is at a second end 58 of the hollow tube 50. Another configuration will be discussed in relation to FIG. 7.) Such partial contraction may be accomplished by heating the second length 54 (only, but not heating the first length 52) to a temperature sufficient to accomplish shrinkage, which is on the order of about 400° F. in the case of a typical heat-shrinkable material, with a heat gun. It is preferred that, in the partially contracted state, an outer diameter $D_2$ of the second length 54 of the hollow tube 50 in the partially contracted state is from about 5 to about 20 percent, most preferably about 10 percent, smaller than an outer diameter $D_1$ of the first length 54 of the hollow tube 50 in the expanded state.

Figure 5:
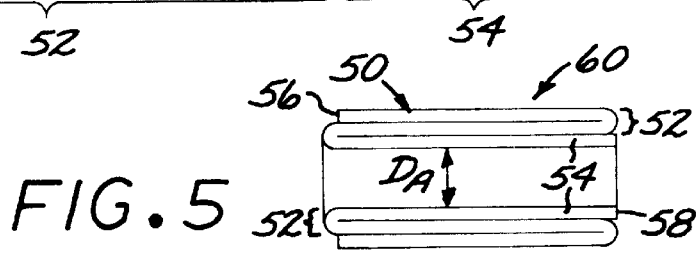
FIG. 5 is a schematic sectional view of the piece of hollow tube of FIG. 4, with the first length folded over the second length.

The first length 52 is next folded over the second length 54, so that the first length 52 lies radially outwardly from, and radially overlies, the second length 54, numeral 36. The result is a folded hollow tube 60 of FIG. 5. The partial contraction of the second length 54 allows this folding of the first length 52 over the second length 54 without collapsing or distorting the second length 54. The first length 52 may be folded over the second length 54 once, and then back over the second length 54 and itself a second time, as shown in FIG. 5. The use of two folds is preferred, as it leaves the ends 56 and 58 readily accessible and properly positioned for later unfolding. Additional folds may be made if desired, but two folds is usually sufficient.

The preparation of the shrinkable hollow tube is complete.

A length of electrical cable 20 is provided, numeral 38, typically without both of the connectors 22 attached. That is, in one case neither of the connectors 22 is present. One of the connectors 22 may instead be attached at one end of the electrical cable 20, and the other connector 22 is attached in a later step.

Figure 6:
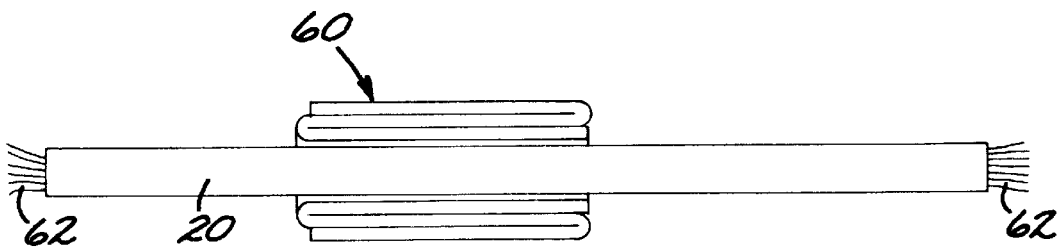
FIG. 6 is a schematic sectional view of the piece of hollow tube of FIG. 5, with an inserted electrical cable but no end connectors.

The length of electrical cable 20 is inserted into the folded hollow tube 60, numeral 40 and FIG. 6. The inner diameter $D_A$ of the folded hollow tube 60 (FIG. 5) is available for insertion of the electrical cable 20. The initial dimensions of the hollow tube 50 and the amount of the partial contraction in step 34 were selected so that this inner diameter $D_A$ is sufficiently large to accomplish the insertion. In this illustration, the electrical cable 20 has no attached connectors at the time of insertion, and wires 62 are visible at both ends. Because of the shortened overall length of the folded hollow tube 60, the wires 62 are readily accessible without having to force the overlying tube back from the ends of the electrical cable 20. Contacts within the electrical connectors 22 are thereafter attached to the wires 62, numeral 42, by any operable approach such as soldering or a mechanical connector.

The first length 52 is unfolded so that it no longer overlies the second length, numeral 44. In this unfolded configuration, the ends 56 and 58 of the hollow tube 50 are abutting against or are adjacent to the connectors 22. The length of the hollow tube 50 was originally selected in conjunction with the length of the electrical cable 20 to achieve this relationship.

The (fully expanded) first length 52 and the (partially contracted) second length 54 of the tube 50 are heated so that they both contract to the fully contracted state over the entire length of electrical cable 20, numeral 46. This heating is typically accomplished by heating to a temperature of about 400° F. in the case of a typical heat-shrinkable material, with a heat gun. This heating temperature may vary according to the material of construction of the tube 50. Although the first length 52 is contracted from the fully expanded state and the second length 54 is contracted from the partially contracted state, the final fully contracted structure of the two lengths 52 and 54 is substantially the same. The contraction ratio and initial dimensions were selected so that the hollow tube 50 shrinks snugly over the length of electrical cable 20.

As noted above, the initial dimensions of the hollow tube 50 and the amount of the partial contraction in step 34 were selected so that the inner diameter $D_A$ is sufficiently large to accomplish the insertion in step 40. The insertion 40 may be made even easier by using the configuration of FIG. 7. In this approach, in the partial contraction step 34 the partially contracted second length 54 is positioned away from the ends 56 and 58, leaving a third length 64 in the expanded state. The first length 52 is therefore at the first end 56 of the hollow tube 50, and the third length 64 is at the second end 58 of the hollow tube 50. The second length 54 is positioned between the first length 52 and the third length 64. When this hollow tube 50 with the three lengths 52, 54, and 64 is folded in step 36 so that the first length 52 overlies the second length 54 (but not the third length 64), the available opening size at the second end 58 is $D_B$, rather than the somewhat smaller $D_A$. The insertion step 40 is therefore made easier.

Figure 7:
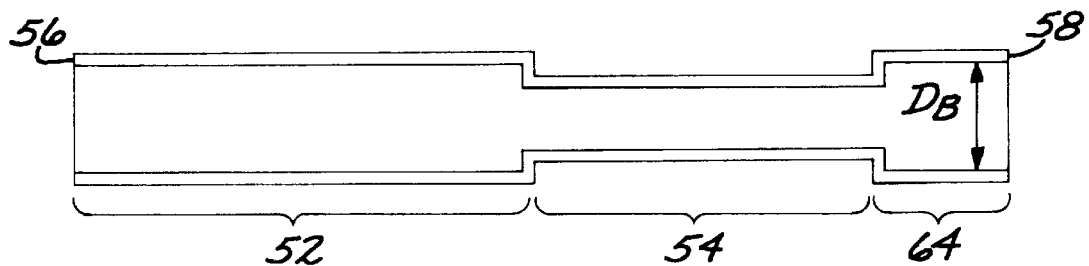
FIG. 7 is a schematic sectional view like that of FIG. 4, showing another embodiment with a third length in the expanded state.

In either the configuration of FIG. 4 or the configuration of FIG. 7, it has been found that the cross sectional area available for the insertion step 40 is open, regular in shape, and substantially circular in shape, so that insertion 40 is relatively easy.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for preparing an article comprising the steps of preparing a shrinkable hollow tube by the steps of
    providing a hollow tube in an expanded state, the hollow tube made of a shape-recovering polymeric material having materials properties described by a fully contracted state, the expanded state which contracts toward the fully contracted state upon heating, and a partially contracted state resulting from a partial contracting from the expanded state toward the fully contracted state,
    partially contracting a portion of a length of the hollow tube, resulting in a first length of the hollow tube in the expanded state and a second length of the hollow tube in the partially contracted state, and
    folding the first length over the second length so that the first length radially overlies the second length.

2. The method of claim 1, wherein the step of partially contracting includes the step of positioning the first length at a first end of the hollow tube, and the second length at a second end of the hollow tube.

3. The method of claim 1, wherein the step of partially contracting includes the step of
    leaving a third length in the expanded state, the first length being at a first end of the hollow tube and the third length being at a second end of the hollow tube, so that the second length is positioned between the first length and the third length.

4. The method of claim 1, wherein the step of providing a hollow tube includes the step of
    providing a hollow tube having a contraction ratio of an outer diameter of the hollow tube in the expanded state to an outer diameter of the hollow tube in the fully contracted state of from about 1.5:1 to about 2.5:1.

5. The method of claim 1, wherein the step of partially contracting includes the step of
    contracting the hollow tube such that an outer diameter of the hollow tube in the partially contracted state is from about 5 to about 20 percent smaller than an outer diameter of the hollow tube in the expanded state.

6. The method of claim 1, wherein the step of folding includes the step of
    folding the first length twice over the second length.

7. The method of claim 1, including additional steps of
    providing a body, and
    inserting the body into the hollow tube.

8. The method of claim 7, wherein the step of providing the body includes the step of
    providing the body as a length of an electrical cable.

9. The method of claim 7, wherein the step of inserting is performed prior to the step of preparing.

10. The method of claim 7, wherein the step of inserting is performed after the step of preparing.

11. The method of claim 7, including additional steps of
    unfolding the first length so that it no longer overlies the second length, and
    contracting the first length and the second length to the fully contracted state over the body.

12. A method for preparing an article comprising the steps of
    preparing a shrinkable hollow tube by the steps of
        providing a hollow tube in an expanded state, the hollow tube made of a shape-recovering polymeric material having materials properties described by a fully contracted state, the expanded state which contracts toward the fully contracted state upon heating, and a partially contracted state resulting from a partial contracting from the expanded state toward the fully contracted state,
        partially contracting a portion of a length of the hollow tube, resulting in a first length of the hollow tube in the expanded state and a second length of the hollow tube in the partially contracted state, and
        folding the first length over the second length so that the first length radially overlies the second length;
    providing a length of electrical cable;
    inserting the length of electrical cable into the hollow tube;
    unfolding the first length so that it no longer overlies the second length; and
    contracting the first length and the second length to the fully contracted state over the length of electrical cable.

* * * * *